United States Patent
Toussaint et al.

(10) Patent No.: US 10,074,877 B2
(45) Date of Patent: *Sep. 11, 2018

(54) METHOD FOR CHARGING A ZINC-AIR BATTERY WITH LIMITED POTENTIAL

(71) Applicant: ELECTRICITE DE FRANCE, Paris (FR)

(72) Inventors: Gwenaelle Toussaint, Nemours (FR); Philippe Stevens, Noisy Rudignon (FR)

(73) Assignee: Electricite de France, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/648,347

(22) PCT Filed: Nov. 25, 2013

(86) PCT No.: PCT/FR2013/052846
§ 371 (c)(1),
(2) Date: May 29, 2015

(87) PCT Pub. No.: WO2014/083268
PCT Pub. Date: Jun. 5, 2014

(65) Prior Publication Data
US 2015/0303530 A1 Oct. 22, 2015

(30) Foreign Application Priority Data
Nov. 29, 2012 (FR) ..................... 12 61398

(51) Int. Cl.
*H02J 7/00* (2006.01)
*H01M 10/44* (2006.01)
*H01M 12/08* (2006.01)

(52) U.S. Cl.
CPC .......... *H01M 10/44* (2013.01); *H01M 12/08* (2013.01); *H02J 7/007* (2013.01); *H01M 10/446* (2013.01); *Y02E 60/128* (2013.01)

(58) Field of Classification Search
CPC ................................. H02J 7/0031
(Continued)

(56) References Cited

U.S. PATENT DOCUMENTS 3,532,548 A   10/1970   Stachurski
4,935,318 A *  6/1990   Ikoma ................. H01M 4/383
                                          29/623.5
(Continued)

FOREIGN PATENT DOCUMENTS

JP   47-033220 A   11/1972
JP   48-001750 A    1/1973
(Continued)

OTHER PUBLICATIONS

Dewi et al., "Cationic polysulfonium membrane as separator in zinc-air cell," Journal of Power Sources, vol. 115, 2003, pp. 149-152.
(Continued)

*Primary Examiner* — Yalkew Fantu
(74) *Attorney, Agent, or Firm* — Drinker Biddle & Reath LLP

(57) ABSTRACT

A method for charging a zinc-air battery, wherein the potential of the negative electrode during the charging is lower than, or equal to, the value of a critical charging potential. Also disclosed is a method for storing and restoring electrical energy, comprising such a charging step, and to a zinc-air battery suitable for implementing said charging method, and a discharging phase.

7 Claims, 2 Drawing Sheets

(58) Field of Classification Search
USPC .......................................................... 320/134
See application file for complete search history.

(56) References Cited

U.S. PATENT DOCUMENTS

| | | | | |
|---|---|---|---|---|
| 5,250,370 A | * | 10/1993 | Faris | B60L 11/185 429/113 |
| 5,306,579 A | | 4/1994 | Shepard, Jr. et al. | |
| 6,991,876 B2 | * | 1/2006 | Narang | H01M 4/364 429/213 |
| 2008/0268327 A1 | * | 10/2008 | Gordon | H01M 2/1646 429/50 |
| 2010/0151336 A1 | * | 6/2010 | Nakanishi | H01M 6/14 429/407 |
| 2011/0143173 A1 | * | 6/2011 | Drews | H01M 12/06 429/50 |
| 2011/0199054 A1 | | 8/2011 | Burchardt et al. | |
| 2012/0249080 A1 | | 10/2012 | Suto | |

FOREIGN PATENT DOCUMENTS

| | | |
|---|---|---|
| JP | 48-070031 A | 9/1973 |
| JP | S60-221974 A | 11/1985 |
| JP | 06-290817 A | 10/1994 |
| JP | 07-282860 A | 10/1995 |
| JP | 2010-086924 A | 4/2010 |
| SG | 195019 A1 | 12/2013 |
| WO | WO 00/36677 A1 | 6/2000 |
| WO | WO 2011/098916 A2 | 8/2011 |
| WO | WO 2012/156639 * | 11/2012 |
| WO | WO 2012/156639 A1 | 11/2012 |

OTHER PUBLICATIONS

Iwakura et al., "Charge-discharge characteristics of nickel/zinc battery with polymer hydrogel electrolyte," Journal of Power Sources, vol. 152, 2005, pp. 291-294.

Lee et al., "Effect of additives on the electrochemical behaviour of zinc anodes for zinc/air fuel cells," Journal of Power Sources, vol. 160, 2006, pp. 161-164.

Lee et al., "Novel electrochemical behavior of zinc anodes in zinc/air batteries in the presence of additives," Journal of Power Sources, vol. 159, 2006, pp. 1474-1477.

Lewis et al., "Alternative separation evaluations in model rechargeable silver-zinc cells," Journal of Power Sources, vol. 80, 1999, pp. 61-65.

Neburchilov et al., "A review on air cathodes for zinc-air fuel cells," Journal of Power Sources, vol. 195, 2010, pp. 1271-1291.

Wu et al., "Study of high-anionic conducting sulfonated microporous membranes for zinc-air electrochemical cells," Materials Chemistry and Physics, vol. 112, 2008, pp. 798-804.

Ye et al., "Zinc ion conducting polymer electrolytes based on oligomeric polyether/PVDF-HFP blends," Journal of Power Sources, vol. 165, 2007, pp. 500-508.

Office Action issued in corresponding application JP 2015-544513, dated Jan. 30, 2017, with English language translation, 7 pages.

Office Action issued in corresponding application KR 10-2015-7017030, dated Dec. 9, 2016, with English language translation, 12 pages.

Office Action issued in corresponding application JP 2017-106397, dated Feb. 19, 2018, with English language translation, 11 pages.

* cited by examiner

METHOD FOR CHARGING A ZINC-AIR BATTERY WITH LIMITED POTENTIAL

CROSS-REFERENCE TO RELATED APPLICATIONS

This application is the U.S. national phase of the International Patent Application No. PCT/FR2013/052846 filed Nov. 25, 2013, which claims the benefit of French Application No. 12 61398 filed Nov. 29, 2012, the entire content of which is incorporated herein by reference.

FIELD

The present invention relates to an electrochemical method for charging a battery of the zinc-air type with an aqueous electrolyte, as well as a method for storing and releasing electrical energy comprising the charging step according to the invention.

BACKGROUND

Metal-air batteries use a negative electrode based on a metal such as zinc, iron or lithium, coupled to an air electrode. The electrolyte used most often is an alkaline aqueous electrolyte.

During discharging of such a battery, oxygen is reduced at the positive electrode and the metal is oxidized at the negative electrode:

Discharge at the negative electrode: $M \rightarrow M^{n+} + n\ e^-$

Discharge at the positive electrode: $O_2 + 2\ H_2O + 4\ e^- \rightarrow 4\ OH^-$ When a metal-air battery has to be recharged electrically, the direction of the current is reversed. Oxygen is produced at the positive electrode and the metal is redeposited by reduction at the negative electrode:

Recharge at the negative electrode: $M_{n+} + n\ e^- \rightarrow M$

Recharge at the positive electrode: $4\ OH^- \rightarrow O_2 + 2\ H_2O + 4\ e^-$ Metal-air systems have the advantage of using a positive electrode of infinite capacity. Electrochemical generators of the metal-air type are therefore known for their high specific energies, which can reach several hundred Wh/kg. The oxygen consumed at the positive electrode does not need to be stored in the electrode but can be taken from the surrounding air. Air electrodes are also used in alkaline fuel cells, which are particularly advantageous compared with other systems owing to the high reaction kinetics at the level of the electrodes and owing to the absence of noble metals such as platinum.

Much work has been carried out over several decades for the development and optimization of air electrodes.

An air electrode is a porous solid structure in contact with the liquid electrolyte. The interface between the air electrode and the liquid electrolyte is a so-called "triple-contact" interface, where the active solid material of the electrode, the gaseous oxidant, i.e. air, and the liquid electrolyte are present simultaneously. A description of the different types of air electrodes for zinc-air batteries is presented for example in the bibliographic article by V. Neburchilov et al., with the title "A review on air cathodes for zinc-air fuel cells", *Journal of Power Sources* 195 (2010) pp. 1271-1291.

Batteries of the metal-air type function very well in discharge, but several problems during recharging have yet to be solved.

On the one hand, the air electrode is not designed to be used in the recharging direction. The air electrode has a porous structure and functions in the form of a volumetric electrode in which the electrochemical reaction takes place in the volume of the electrode, at the interface between a gas (the oxygen of the air), a liquid (the electrolyte) and a solid (the electrode and the catalyst). Thus, the interface between the air electrode and the liquid electrolyte is a so-called "triple-contact" interface where the active solid material of the electrode, the gaseous oxidant, i.e. air, and the liquid electrolyte are present simultaneously. The air electrode is usually composed of carbon particles with a large surface area such as Vulcan® XC72 marketed by Cabot. The surface area of the carbon can be increased by reaction with a gas, such as CO, prior to its integration in the air electrode. A porous electrode is then produced by agglomeration of the carbon particles using a fluorinated hydrophobic polymer such as FEP (fluorinated ethylene propylene) marketed by the company DuPont. Patent WO 2000/036677 describes such an electrode for a metal-air battery.

It is preferable to have a reaction surface area on the air electrode that is as large as possible, in order to have a current density relative to the geometric surface area of the electrode that is as high as possible. A large reaction surface area is also useful because the density of gaseous oxygen is low compared with a liquid. The large surface area of the electrode allows the reaction sites to be multiplied. Conversely, this large reaction surface area is no longer necessary for the reverse reaction of oxidation during recharging since the concentration of active material is much higher.

The use of an air electrode in the recharging direction to bring about an oxidation reaction and evolution of oxygen presents many drawbacks. The porous structure of the air electrode is fragile. It was observed by the inventors that this structure was destroyed mechanically by the evolution of gas when it was used to produce oxygen by oxidation of a liquid electrolyte. The hydraulic pressure generated within the electrode by the production of gas is sufficient to cause the bonds between the carbon particles constituting the air electrode to rupture.

It was also observed by the inventors that the catalyst added to the air electrode to improve the energy yield of the reaction of reduction of oxygen, such as manganese oxide or cobalt oxide, is not stable at the potential required for the reverse oxidation reaction. The corrosion of carbon in the presence of oxygen by oxidation of carbon is also accelerated at higher potentials.

Some inventors propose using a more resistant oxygen reduction catalyst coupled to an oxygen evolution catalyst in a bifunctional electrode composed of two electrically coupled layers, as described in patent U.S. Pat. No. 5,306,579. However, this configuration produces electrodes that nevertheless have a short service life and a limited number of cycles.

The degradation of the air electrode, when it is used to recharge the metal-air battery, greatly reduces the battery's service life. This is one of the main reasons for the low level of commercial development of electrically rechargeable metal-air accumulators.

A means for protecting the air electrode against degradation consists of using a second positive electrode, which is used for the oxygen evolution reaction. The air electrode is then decoupled from the oxygen evolution electrode and only the latter is used during the charging phase. For example, patent U.S. Pat. No. 3,532,548 of Z. Starchurski describes a zinc-air battery with a second auxiliary electrode used for the charging phase.

On the other hand, certain problems can also arise on the negative electrode side during electrical recharging of a metal-air battery, and quite particularly a zinc-air battery.

During recharging, the $Zn^{2+}$ metal ions are reduced at the negative electrode and are deposited in their metallic form Zn once the potential at the level of this electrode is sufficiently negative. A uniform and homogeneous deposit of metal on the electrode is desired for ensuring good durability during the cycles of charging and discharging of this electrode.

It was found that, under certain conditions, the metal was deposited in the form of foam with little adherence to the surface of the electrode, and this foam could then become detached from the electrode, causing a loss of active material and consequently a loss of specific capacity of the battery. In other cases, it was found that the metal could also be deposited in dendritic form. These dendrites can grow until they reach the positive electrode during charging, causing an internal short-circuit, preventing recharging.

In an endeavour to solve these problems, and produce a homogeneous zinc deposit during recharging, certain solutions have already been proposed:
  adding additives into the electrolyte (see for example C. W. Lee et al., "Effect of additives on the electrochemical behaviour of zinc anodes for zinc/air fuel cells", *Journal of Power Sources* 160 (2006) 161-164, and C. W. Lee et al., "Novel electrochemical behavior of zinc anodes in zinc/air batteries in the presence of additives", *Journal of Power Sources* 159 (2006) 1474-1477),
  fitting a separator on the electrode (see for example H. L. Lewis et al., "Alternative separation evaluations in model rechargeable silver-zinc cells", *Journal of Power Sources* 80 (1999) 61-65, and E. L. Dewi et al., "Cationic polysulfonium membrane as separator in zinc-air cell", *Journal of Power Sources* 115 (2003) 149-152),
  using a polymer hydrogel electrolyte as solid electrolyte (see for example C. Iwakura et al., "Charge-discharge characteristics of nickel/zinc battery with polymer hydrogel electrolyte" *Journal of Power Sources* 152 (2005) 291-294, G. M. Wua et al., "Study of high-anionic conducting sulfonated microporous membranes for zinc-air electrochemical cells", *Materials Chemistry and Physics* 112 (2008) 798-804, and H. Ye et al., "Zinc ion conducting polymer electrolytes based on oligomeric polyether/PVDF-HFP blends" *Journal of Power Sources* 165 (2007) 500-508).

Moreover, the Lawrence Berkeley Laboratory (LBL) and MATSI Inc. have sought to increase the porosity in the electrode in order to decrease the surface current densities responsible for the formation of dendrites, when they are high.

SUMMARY

Despite these various proposals, the problems encountered during recharging of a zinc-air battery have not been solved. One of the aims of the present invention is to propose a method for charging a zinc-air battery that does not cause formation of a zinc deposit that is harmful to the proper operation of the battery, in particular deposits in the form of foam or in the form of dendrites, on the negative electrode.

Such an improved charging method must make it possible to increase the number of cycles of electrical charging and discharging of the zinc-air battery, and thus advantageously endow the battery with a longer service life.

It was observed by the inventors that controlling the potential of the negative electrode during charging to prevent it becoming too high makes it possible to limit the formation of zinc deposits in the form of foam or dendrites.

A subject of the present invention is a method for charging a zinc-air battery comprising at least one negative electrode, a first positive air electrode and a second positive oxygen evolution electrode, characterized in that the potential of the negative electrode during charging is kept at an absolute value less than or equal to the value of a critical charging potential.

In addition, a subject of the present invention is a method for storing and releasing electrical energy using a zinc-air battery comprising at least a negative electrode and a positive air electrode, comprising the following successive steps:
  (a) a charging phase, as defined above, and
  (b) a discharging phase.

Finally, a zinc-air battery comprising:
  a negative terminal,
  a positive terminal,
  a negative electrode, connected to the negative terminal,
  a first positive air electrode,
  a second positive oxygen evolution electrode,
  a switching means allowing either the first positive air electrode or the second positive oxygen evolution electrode to be connected to the positive terminal,
  a means for charging the battery, which is connectable to the negative electrode and to the second positive oxygen evolution electrode, and
  a means for controlling charging of the battery adapted for measuring the voltage between the negative electrode and the first positive air electrode, and for acting on the charging means so that the absolute value of this voltage is less than or equal to a critical value of potential,
is also a subject of the present invention.

DETAILED DESCRIPTION

Figure 1:
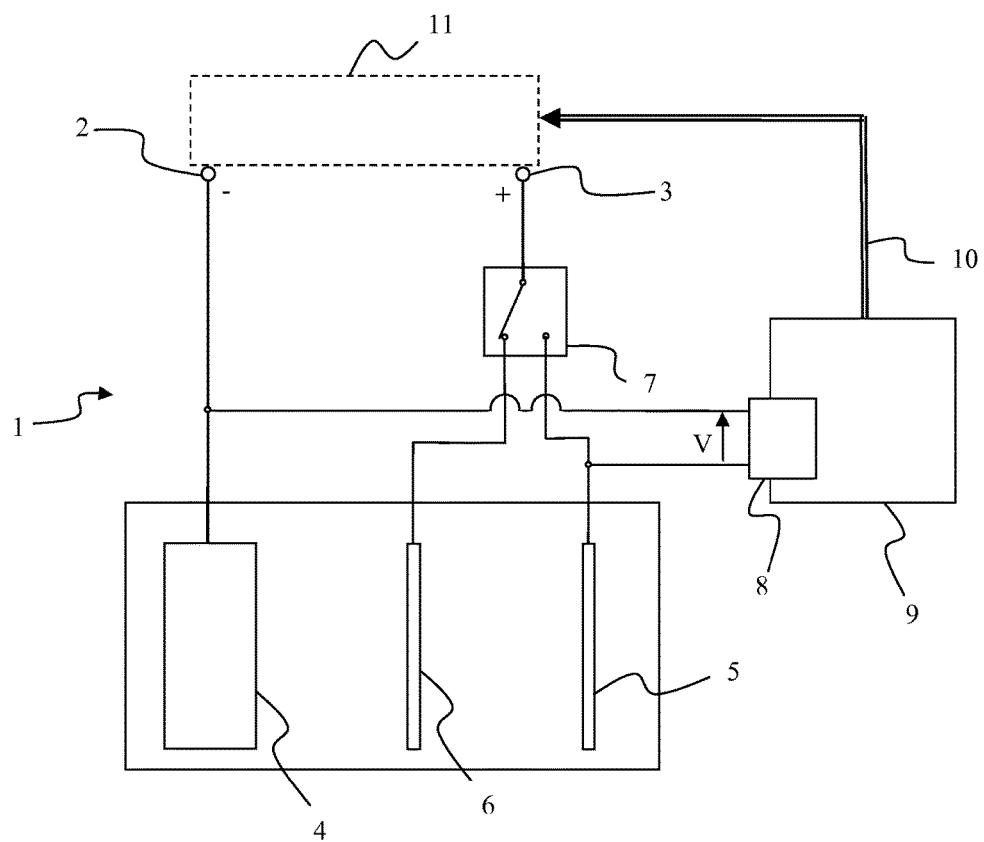
FIG. 1, appended to the present application, is a diagrammatic representation of an embodiment of a battery forming the subject of the present invention, in a recharging configuration.

In the present application, the terms "charging" and "recharging" are used as synonyms, and are interchangeable.

The charging method according to the present invention is implemented on a battery of the zinc-air type. This zinc-air battery comprises, conventionally, at least a negative electrode, a first positive air electrode and a second positive oxygen evolution electrode. The negative electrode is a zinc electrode ($Zn/Zn^{2+}$).

The first positive electrode of the battery according to the invention is an air electrode. This type of electrode has been described in general above. Any type of air electrode can be used in the battery according to the present invention. In particular, the first positive air electrode of the battery can be an electrode obtained by agglomeration of a carbon powder constituted by carbon particles with a large specific surface area, as described in patent application WO 2000/036677.

The air electrode, based on carbon particles, can further contain at least one oxygen reduction catalyst. This oxygen reduction catalyst is preferably selected from the group constituted by manganese oxide and cobalt oxide.

The second positive electrode of the battery according to the invention is an oxygen evolution electrode. Any type of electrode performing this function known to a person skilled in the art can be used in the battery according to the present invention. The second positive oxygen evolution electrode can for example be a metal electrode that is stable in the electrolyte of the battery, such as an electrode made of silver, of nickel or of stainless steel.

This battery subjectable to one or more charging phases and one or more discharging phases.

The method according to the invention relates in particular to the charging phase. The inventors discovered that to solve the problems connected with the formation of a zinc deposit that is harmful to proper operation of the battery, in particular deposits in the form of foam or in the form of dendrites, on the negative electrode, the potential of the negative electrode during charging had to be kept at an absolute value less than or equal to the value of a critical charging potential.

The value of the critical charging potential of the battery can vary depending on the nature of the battery in question, for example depending on the nature of the electrodes. The critical charging potential can have been established beforehand for a given battery, and it can therefore be an item of data supplied with the battery, for example by a manufacturer. This potential can also be determined experimentally prior to recharging it.

In particular, the critical charging potential of a zinc-air battery according to the invention can be determined according to the following method:
  beginning charging said zinc-air battery, by passing a constant current between the zinc electrode and the second positive oxygen evolution electrode,
  measuring the potential of the zinc electrode relative to the first air electrode after charging for one minute, and
  determining the critical charging potential by adding 20 mV to the absolute value of said measured potential.

The critical charging potential can be comprised between 1.45 V and 1.70 V, preferably between 1.47 V and 1.58 V.

Control of the potential of the negative electrode can comprise measuring this potential, comparing it with the value of the critical charging potential, and feedback to the charging process to keep the absolute value of the potential at the desired value.

The potential of the negative electrode of the zinc-air battery can be measured according to the methods known to a person skilled in the art. However, in the case of metal-air batteries, it is known that, during charging, the potential of the positive electrode increases much more rapidly than the potential of the negative electrode. Because of this, it is possible that the potential difference measured between the positive terminal and the negative terminal of the battery may not accurately reflect the potential of the negative terminal instantaneously, and that the control of the voltage at the terminals of the battery may not be sufficiently precise to provide control of the potential of the negative electrode.

That is why the potential of the negative electrode can advantageously be measured relative to a reference electrode. A reference electrode is an electrode the potential of which is set during measurement. A working electrode, i.e. an electrode that is active during the electrochemical reaction, cannot be a reference electrode as its potential varies owing to the passage of the current.

Preferably, said reference electrode is the air electrode of the battery which is not used during charging. The potential of the negative electrode can therefore be measured relative to the first positive air electrode. In fact, during the charging phase of the battery, the first air electrode is not the working electrode, and no current circulates through it.

Use of the positive air electrode as reference electrode for measuring the potential of the negative electrode during the charging phase of the battery is particularly advantageous as it is not necessary to add to the device an electrode which would be dedicated to this function alone. This embodiment has the advantage of being simple and inexpensive as it does not require critical structural modifications to already existing batteries in order to be implemented. Advantageously, the latter do not comprise an additional electrode, and their weight and their overall dimensions are unaffected.

The charging method according to the invention can comprise two steps:
  a first step during which the charging current is applied and the potential of the negative electrode varies freely, until it reaches an absolute value less than or equal to the critical charging value, then
  a second step during which the potential of the negative electrode is set, preferably at the critical charging value, and the charging current varies freely.

Preferably, charging is stopped when the absolute value of the charging current reaches a predefined minimum value. Said predefined minimum value can be comprised between 5% and 30% of the current at the start of charging, preferably between 8% and 20% of the current at the start of charging, and more preferably between 10% and 15% of the current at the start of charging. This stopping of the charging phase advantageously makes it possible to avoid formation of zinc dendrites and foam, which can occur at the end of charging when the reaction of reduction of water to hydrogen becomes predominant.

The charging phase described above can form part of a method for storing and releasing electrical energy. Another subject of the present invention is a method for storing and releasing electrical energy using a zinc-air battery comprising at least a negative electrode and a positive air electrode, comprising the following successive steps:
  (a) a charging phase, as defined above, and
  (b) a discharging phase.

During the charging phase (a), the second positive oxygen evolution electrode can be used as the working electrode of the battery, i.e. as the active positive electrode on which the electrochemical reaction occurring during recharging of the battery takes place.

During the discharging phase (b), the second positive oxygen evolution electrode is disconnected and the first positive air electrode can be used as the working electrode, i.e. as the active positive electrode on which the electrochemical reaction occurring during discharging of the battery takes place.

Moreover, a subject of the present invention is a zinc-air battery for implementing the charging method according to the invention, as well as the method for storing and releasing electrical energy, also a subject of the present invention. Said zinc-air battery comprises:
  a negative terminal,
  a positive terminal,
  a negative electrode, connected to the negative terminal,
  a first positive air electrode,
  a second positive oxygen evolution electrode, a switching means allowing either the first positive air electrode or the second positive oxygen evolution electrode to be connected to the positive terminal, a means for charging the battery, which is connectable to the negative electrode and to the second positive oxygen evolution electrode, and a means for controlling charging of the battery adapted for measuring the voltage between the negative electrode and the first positive air electrode, and for acting on the charging means so that the absolute value of this voltage is less than or equal to a critical value of potential.

Besides the three electrodes described above, this zinc-air battery comprises a negative terminal and a positive terminal. These two terminals allow the battery to be connected in order to form a power circuit: either a charging circuit in which the battery is connected to a charging means which supplies energy to the battery or a discharging circuit in which the battery is connected to any device to which it supplies energy. The negative electrode is connected permanently, i.e. during charging and during discharging, to the negative terminal of the battery. During the charging phase (a), the second positive oxygen evolution electrode is connectable to the positive terminal of the battery and the first positive air electrode is disconnected from the positive terminal of the battery. During the discharging phase (b), the first positive air electrode is connectable to the positive terminal of the battery and the second positive oxygen evolution electrode is disconnected from the positive terminal of the battery.

The battery also comprises a switching means allowing either the first positive air electrode or the second positive oxygen evolution electrode to be connected to the positive terminal. According to an embodiment, switching of the connection of the positive terminal between the first and the second positive electrode can be operated manually. However, advantageously, the switching means are connectable to a switching control means. This means can be electronic, and it can advantageously be an element of an electronic control system or a BMS. The switching control means can operate the switching means so that it is the first positive air electrode that is connected to the positive terminal of the battery when the latter is being discharged and it is the second positive oxygen evolution electrode that is connected to the positive terminal of the battery when the latter is being recharged.

The switching control means can be adapted for measuring the voltage between the positive and negative terminals of the battery. This involves measuring the potential difference between the two working electrodes, namely between the negative electrode and the first positive air electrode during discharging and between the negative electrode and the second positive oxygen evolution electrode during recharging.

The battery also comprises a means for charging the battery, which is connectable to the negative electrode and to the second positive oxygen evolution electrode, and a means for controlling charging of the battery adapted for measuring the voltage between the negative electrode and the first positive air electrode, and for acting on the charging means so that the absolute value of this voltage is less than or equal to a critical value of potential.

This charge controlling means can be an element of an electronic control system or a BMS. The charge controlling means can be adapted for continuously comparing, during charging, the value of the potential of the negative electrode measured according to the invention against a set value, here the critical value of the potential, and for sending a regulation signal to the battery's charging means so that the absolute value of the measured potential remains below the set value.

Furthermore, this charge controlling means can also be adapted for continuously comparing, during charging, the value of the charging current against a set value, here a predefined limit current, and for sending a regulation signal to the battery's charging means so that charging is stopped when the measured current falls below this set value.

The invention will now be described in more detail with reference to the appended FIG. 1, showing diagrammatically an embodiment of a zinc-air battery forming the subject of the present invention, in a charging configuration.

The battery 1 comprises a negative terminal 2, a positive terminal 3, a negative electrode 4, connected to the positive terminal 2, a first positive air electrode 5 and a second positive oxygen evolution electrode 6. In the configuration shown in FIG. 1, which is a configuration that the battery can assume during a charging phase, it is the second positive oxygen evolution electrode 6 that is connected to the positive terminal 3 of the cell. However, the battery 1 also comprises a switching means 7 that makes it possible to disconnect the second positive oxygen evolution electrode 6 from the positive terminal 3 in order to connect the first positive air electrode 5 to it during the discharging phases. A charging means 11 is connected to the negative 2 and positive 3 terminals of the battery.

The battery 1 further comprises a means for measuring the potential of the negative electrode 8. This potential is measured by measuring the voltage V between the negative electrode 4 and the first positive air electrode 5. During the charging phase of the battery shown, the first positive air electrode 5 performs the role of a reference electrode as it is not connected to the positive terminal 3 of the battery.

The battery 1 further comprises a charge controlling means 9. This charge controlling means 9 continuously compares, during recharging, the value V measured by the measuring means 8 against a set value Vc, and the charge controlling means 9 sends a regulation signal 10 to the battery's charging means 11 so that the absolute value of the measured potential remains below the value of a critical charging potential defined beforehand.

EXAMPLE

A zinc-air battery was used, comprising a negative zinc electrode of 30 cm$^2$, a first positive air electrode composed of two electrodes of 30 cm$^2$ of the E4 type marketed by the company "Electric Fuel" from the Aero Tech group connected in parallel and arranged symmetrically on either side of the zinc electrode and a second positive oxygen evolution electrode composed of two grids of nickel metal of 30 cm$^2$ connected in parallel and arranged symmetrically on either side of the zinc electrode.

For this battery, the critical value of the potential of the negative electrode was determined as follows:

The charging current was set at a constant value of −700 mA. After charging for 1 minute at this set current, the potential of the negative electrode was measured relative to the air electrode and had a value of −1.50 V. The potential of the negative electrode was therefore determined by adding 20 mV to the absolute value of this measured potential, or −1.52 mV.

Figure 2:
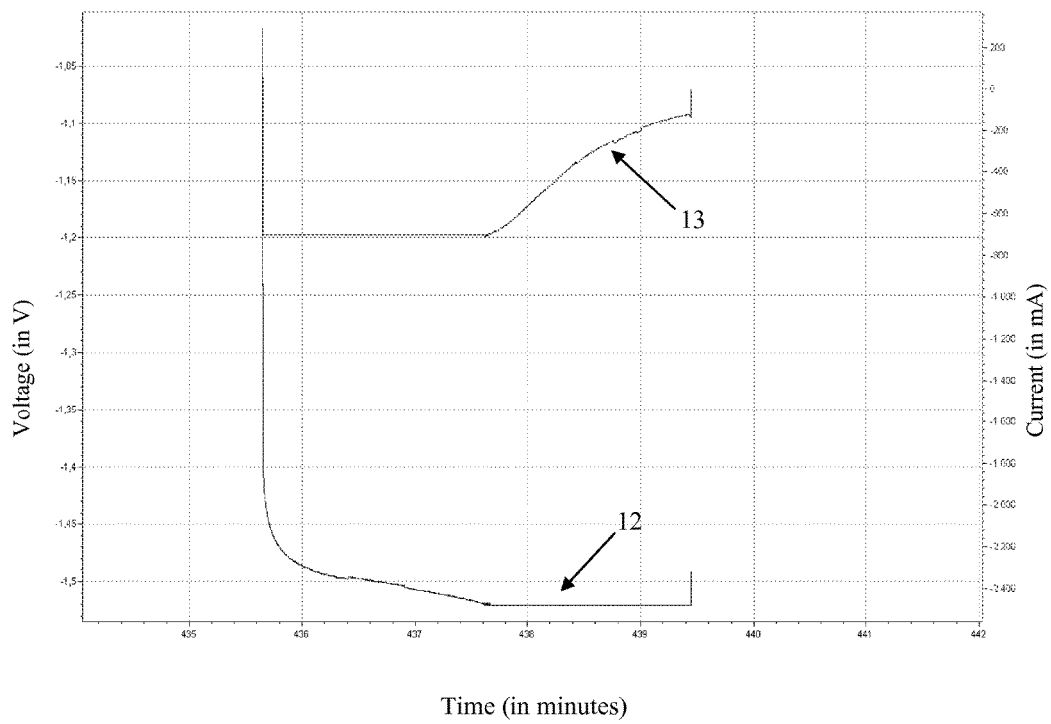
FIG. 2 shows an example of voltage between the negative electrode and the air electrode and of charging current, of a zinc-air battery during a charging phase, as a function of time.

This battery was recharged according to the method forming the subject of the present application. The charging curves are shown in FIG. 2: the voltage between the negative electrode and the air electrode as a function of time is shown as curve 12; the charging current as a function of time is shown as curve 13.

In a first period, the charging current was set at −700 mA. The voltage between the negative electrode and the air electrode was left free to vary during this phase, checking that it does not exceed the limit value of −1.52 mV.

When this value of −1.52 mV was reached for the first time, the potential of the negative electrode was set equal to this value of −1.52 mV. Charging of the battery was then continued for a second period with a set voltage and the charging current was then left free to vary.

Charging was stopped when the absolute value of the charging current reached a minimum value set beforehand at −120 mA.

The inventors found that by following this charging method, the zinc-air battery did not show signs of degradation that would be due to the formation of a deposit of zinc in the form of foam or in the form of dendrites on the negative electrode. The zinc-air battery was able to undergo a series of 500 cycles of charging as described above and of discharging without showing signs of degradation.

In another example using the same device, in the same configuration, the charging current was set at −700 mA but the voltage between the negative electrode and the air electrode was left free without any control or any upper limit throughout the charging. The potential of the negative electrode relative to the air electrode rose to 1.68 V. A short-circuit between the negative electrode and the positive electrode used during charging was observed after 12 cycles.

The invention claimed is:

1. A method for charging a zinc-air battery comprising at least a negative electrode, a positive air electrode and a positive oxygen evolution electrode, wherein a potential of the negative electrode during charging is kept at an absolute value less than or equal to the value of a critical charging potential; the critical charging potential corresponding to a value above which zinc deposits in the form of foam or dendrites appear on the negative electrode; wherein said charging of the battery is performed in two steps:
   a first step during which the charging current is applied and the potential of the negative electrode varies freely, until it reaches an absolute value less than or equal to a critical charging value, then
   a second step during which the potential of the negative electrode is set, preferably at the critical charging value, and the charging current varies freely.

2. The method of claim 1, wherein the potential of the negative electrode is measured relative to a reference electrode.

3. The method of claim 2, wherein said reference electrode is the air electrode of the battery which is not used during charging.

4. The method of claim 1, wherein charging is stopped when the absolute value of the charging current reaches a predefined minimum value.

5. The method of claim 1, wherein the critical charging potential has been determined according to the following method:
   beginning charging said zinc-air battery, by passing a constant current between the zinc electrode and the positive oxygen evolution electrode,
   measuring the potential of the zinc electrode relative to the positive air electrode after charging for one minute, and
   determining the critical charging potential by adding 20 mV to the absolute value of said measured potential.

6. A method for storing and releasing electrical energy using a zinc-air battery comprising at least a negative electrode and a positive air electrode, comprising the following successive steps:
   (a) a charging phase carried out according to claim 1, and
   (b) a discharging phase.

7. A zinc-air battery comprising:
   a negative terminal,
   a positive terminal,
   a negative electrode, connected to the negative terminal,
   a positive air electrode,
   a positive oxygen evolution electrode,
   a switch allowing either the positive air electrode or the positive oxygen evolution electrode to be connected to the positive terminal,
   a charger for charging the battery, which is connectable to the negative electrode and to the positive oxygen evolution electrode, and
   a controller for controlling charging of the battery adapted for measuring the voltage between the negative electrode and the positive air electrode, and for acting on the charger so that the absolute value of this voltage is less than or equal to a critical value of potential, the critical value of potential corresponding to a value above which zinc deposits in the form of foam or dendrites appear on the negative electrode.

* * * * *